March 31, 1959 W. F. B. PEUSS 2,879,538
APPARATUS FOR REMOVING THE SHELLS OF CRUSTACEANS
Filed Dec. 5, 1955 2 Sheets-Sheet 1

INVENTOR:
Walter Franz Barthold Peuss
By Walter Buhn
Patent Agent.

March 31, 1959 W. F. B. PEUSS 2,879,538
APPARATUS FOR REMOVING THE SHELLS OF CRUSTACEANS
Filed Dec. 5, 1955 2 Sheets-Sheet 2
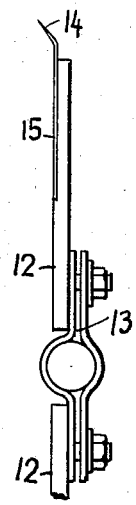
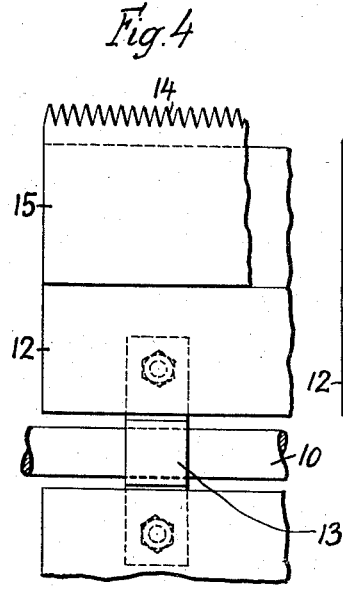
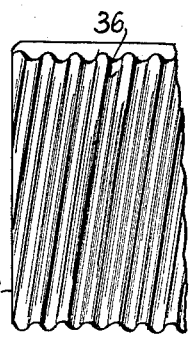
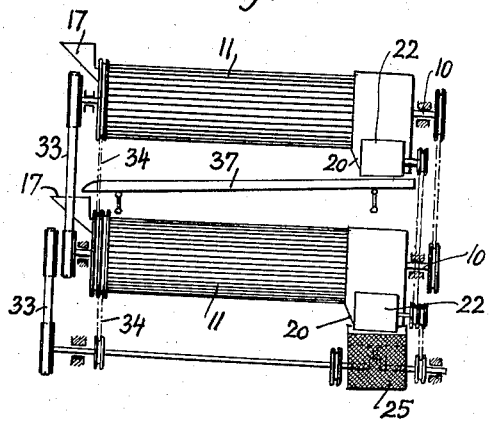
INVENTOR:
Walter Franz Barthold Peuss
By
Patent Agent

# United States Patent Office 2,879,538
Patented Mar. 31, 1959

2,879,538

APPARATUS FOR REMOVING THE SHELLS OF CRUSTACEANS

Walter Franz Barthold Peuss, Dorumer-Strich uber Wesermunde, Germany

Application December 5, 1955, Serial No. 551,113

Claims priority, application Germany December 8, 1954

4 Claims. (Cl. 17—2)

The present invention relates to a machine for removing the shell of crustaceans, and particularly crabs or shrimps.

Prior to this invention, shelling devices have been known in which the crabs were continuously passed along suitable means for ripping off the shells, and also such devices in which the shelling tools were formed by inclined steel plates which were provided with ripping hooks and mounted within channels which were open on both ends and through which the freshly boiled crustaceans were passed. Such movement of the crustaceans was either produced by centrifugal force if the channels were of the revolving type or by means of a current of compressed air if the channels were stationary. These prior devices had the serious disadvantage that the mentioned channels were easily clogged by the crustaceans.

Furthermore, since the crabs or shrimps were shelled in these prior devices merely by passing them past the ripping plates by means of centrifugal force or compressed air, the proper shelling of the crustaceans depended largely upon their thickness, and thus many of them were shelled incompletely.

It is an object of the present invention to provide a machine for shelling crustaceans and particularly crabs or shrimps in which the freshly boiled crustaceans while passing through the apparatus are substantially prevented from clogging the same.

More specifically, it is an object of the invention to prevent the shelling machine from being clogged by repeatedly revolving the crustaceans during their passage through the machine.

Another object of the invention is to provide a new type of shelling tool whereby the shells of the crustaceans such as crabs, shrimps or the like are cracked and loosened by repeated blows upon them and are subsequently removed by suitable ripping hooks.

An essential feature of the invention for attaining these objects consists in the provision of shelling tools in the form of wingshaped throwing and beating arms which are mounted on a rotatable shaft and provided along their outer edges with ripping hooks. These tools operate within a rotatable drum so that the crabs or shrimps which are fed into one end of the drum are moved along with the wall of the drum in the direction of rotation thereof and subjected by the beating arms to repeated blows and, if necessary, a ripping action upon their shells.

Another important feature of the invention is that the crustaceans are uniformly conveyed in the longitudinal direction of the drum, and the shelled animals together with any possible shell portions remaining thereon are then removed therefrom.

Another feature of the invention resides in providing the drum with suitable perforations or passages, for example, by making it in the shape of a rotary screen, so that at least a portion of the crushed shells will drop from the drum of its own accord.

Additional features of the invention reside in the particular design and construction of the throwing and beating arms, and in the means for driving the drum and beating arms at different speeds and, if desired, in opposite directions of rotations of each other.

Further objects, features, and advantages of the present invention will appear from the following detailed description thereof, as well as from the accompanying detail drawings, in which—

Fig. 3 shows an enlarged side view of a beating arm;

Fig. 4 is a likewise enlarged partial front view of the beating arms;

Fig. 5 represents an enlarged partial front view of a portion of a modified beating arm; while Fig. 6 shows a front view of a modified machine according to the invention.

Figure 1:
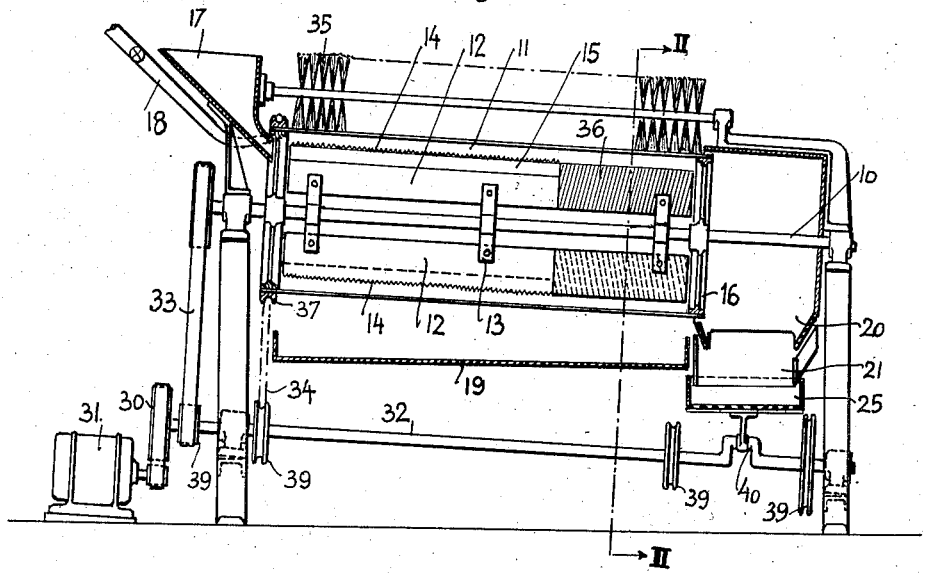
Fig. 1 shows a front view, partly in section, of the new machine.

Referring to the drawings, and to Figs. 1 to 4 thereof in particular, the machine shown therein comprises a cylindrical drum 11 rotatably mounted on a shaft 10 which carries two or more wing or plate-shaped throwing and beating arms 12 which may also be termed beating vanes. These arms or beater vanes which are shown on an enlarged scale in Fig. 3 may consist of boards which are secured to shaft 10 by means of clamping rings 13. Preferably, the arms 12 may extend radially and in a starlike formation from shaft 10 and substantially along the entire length of drum 11. The arms 12 have metallic tearing means in form of steel plates 15 secured thereto which are bent near their free outer ends in the direction of rotation of said arms so as to form serrated outer ends or ripping hooks 14. Between the outer ends of the ripping hooks 14 and the inner wall of the drum 11 is left a passage sufficient to allow the crustaceans to pass through drum 11 toward the discharge end 16 thereof.

The already boiled crabs or shrimps are filled into drum 11 through a funnel 17. A sharp stream of water passing through a jet pipe 18 and directed toward the inner wall of drum 11 may be turned on from time to time to clean the drum.

Figure 2:
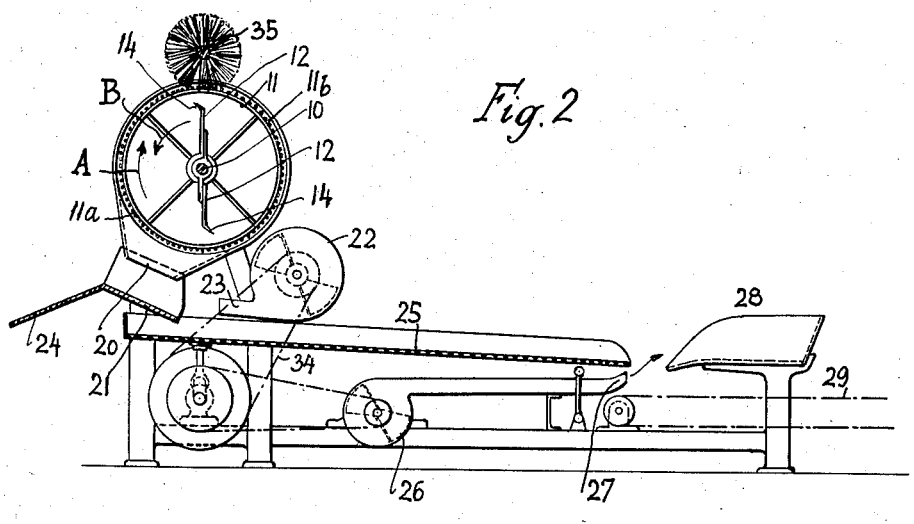
Fig. 2 shows a cross section taken along line II—II of Fig. 1.

By rotating drum 11, for example, in the direction shown by the arrow A in Fig. 2, the crabs or shrimps therein will be taken along and lifted by the drum wall. At the same time, however, they will be caught by the beating arms 12 rotating in the opposite direction, as shown by arrow B and beaten in a downward direction. Since the continuous movement of drum 11 will then pick up the crabs and again carry them in the opposite direction where they will be caught again by arms 12, they will be subjected to repeated beating by arms 12 until their shells crack.

As indicated in Fig. 1, drum 11 and shaft 10 are preferably slightly downwardly inclined toward the discharge end 16 so that the bodies while being beaten are gradually moving toward the discharge end 16.

Drum 11 is preferably designed in form of a rotary screen comprising slots or perforations 11b. Such screen may, for example, be formed by making the drum wall of a series of rods or wires 11a which are mounted in a circular arrangement and spaced from each other by a sufficient distance to permit smaller shell portions which have been broken up to drop through the intermediate slots 11b whereupon they will be caught underneath drum 11 by a tray 19. Such slots or perforations 11b in the wall of drum 11 are not large enough to permit the crabs or shrimps to fall therethrough, but they increase the grip of wall 11 upon the crustaceans so that they will be picked up thereby and taken along or thrown upwardly by the rotation of drum 11. At the discharge end of drum 11 a stationary receiver 20 is mounted, the lower outlet of which terminates in an inclined chute 21 upon which a blower 22 throws a strong current of air through an outlet pipe 23 in a direction opposite to the downward passage of the crabs so as to blow off the lighter shells which are removed by a chute 24 which is inclined in a direction opposite to that of chute 21. The crabmeat, however, passes upon a conveyor surface, for example, a shaking screen 25, at the end of which another sharp air current which is produced by a blower 26 issues from a nozzle 27 and hits the crabmeat from underneath so as to separate those shells therefrom which have not already been removed through the slots or perforations 11b in the drum wall 11 or have been blown off by blower 22, or have dropped through the perforations on shaking screen 25. These shells are blown into a chutelike container 28, whereas the clean crabmeat drops upon a conveyor belt 29.

The entire machine may be driven by a single motor 31 through a gear or belt transmission 30 and a drive shaft 32. For this purpose, drum 11 may carry a pulley 37 at one or both ends thereof, whereas beater shaft 10 carries a pulley (not shown), and these pulleys as well as those for blowers 22 and 26 may be connected to suitable pulleys 39 on shaft 32 by belts 33, 34. A crank 40 on driveshaft 32 may drive shaking screen 25.

Drum 11 and beating arms 12 are preferably rotated in opposite directions and at different speeds, and it has been found that the best results may be achieved if beating arms 12 on shaft 10 are rotated at a considerably higher speed than drum 11 so as to exert a strong and frequent beating action upon the crustaceans. Instead of rotating drum 11 and beating arms 12 in opposite directions, as indicated in Fig. 2, drum 11 may also be driven in the same direction as the faster running arms 12.

In addition to the cleaning action produced by the water jet passing through pipe 18, a further cleaning action may be obtained by having one or more rotary brushes 35 mounted at such a distance from drum 11 that the bristles thereof enter into drum 11, at least to some extent, through the slots or perforations 11b in the wall of the drum. At least one brush 35 is preferably mounted as shown in Fig. 1 so as to cooperate directly with the cleaning action of the water jet 18. Brush 35 will thus continuously prevent the crabmeat and the knocked-off shells from clogging slots 11b. The crabs or shrimps which are not immediately caught by beating arms 12 will then pass upwardly along the wall of drum 11 until they are pushed off by the bristles of brush 35. They will then drop downwardly and while doing so are caught and beaten by the rotating arms 12. Since the rotation of drum 11 is automatically transmitted to brush 35 through the connection of the bristles with the edges of slots 11b in the wall of the drum, no separate driving means for brush 35 will ordinarily be required. If a separate drive of brush 35 should, however, be desired, this may be done, for example, by a pulley and belt connection to the main drive shaft 32.

From the above description of the new machine it will be clear that during their gradual movement from the inlet side toward the outlet 16, the crabs or shrimps will be beaten many times by arms 12 so that their shells will surely be crushed and removed during such passage without any danger that the perforations or slots 11b in the wall of drum 11 will be clogged up.

It has also been found that it may be of advantage to provide ripping hooks 14 along a part only of the length of beating arms 12, as indicated in Fig. 1, and to provide the flat surface of the remainder of the arms with grooves 36 as also illustrated in Fig. 5, or at least to roughen or serrate such surface. Such grooves or serrations 36 are preferably slightly inclined. Thus, while being beaten by arms 12, the crabs or shrimps are first subjected to the ripping action of hooks 14 and then to a rubbing or scrubbing action by the rough surface of arms 12 so as to remove the shells completely from the crab or shrimp meat and to clean said meat also of the last shell portions.

A modification of the invention is illustrated in Fig. 6, in which two drums 11 are rotatably mounted above each other in a slightly inclined position. Both drums are provided with beating arms as previously described, and the two drums 11 are connected by an inclined passage 37 which may form a shaking screen for conveying the partly shelled crustaceans from the outlet 20 of the upper drum to the inlet funnel 17 of the lower drum. If desired, only the beating arms 12 of the upper drum 11 may be provided along their edges with ripping hooks 14, while those of the lower drum may have roughened surfaces only. The upper drum will then remove the larger portion of the shells, while in the lower drum the crabs or shrimps are cleaned completely of the remainder of the shells, and particularly of the legs, tails, and the like. Obviously, if desired, three or even more drums with interconnecting passages 37 may be provided.

Instead of mounting the drum or drums 11 at a slight angle, as shown in Figs. 1 to 6, they may also be mounted horizontally. With such an arrangement, the gradual conveying action upon the crustaceans from one end of the drum to the other end may be obtained by extending either the rods or wires 11a which form the screen wall, or the beating arms 12 or both in a slightly helical direction from one end of the drum to the other end thereof.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An apparatus for removing the shells from crustaceans such as crabs and shrimps, which comprises in combination: supporting means, a drum rotatably supported by said supporting means, said drum having a charging opening at one end thereof for charging crustaceans to be freed from their shells into said drum and also having a discharge opening at the other end of said drum for discharging the shelled meat of said crustaceans, the wall of said drum being provided with openings of a size permitting passage of smaller portions of said shells while retaining larger portions of said crustaceans, said wall exerting a gripping action upon said crustaceans, a shaft rotatably arranged within said drum, a plurality of substantially flat rigid beater vanes carried by said shaft for rotation therewith, each beater vane extending in the axial direction of said shaft for a length approximately equal to the length of said drum and extending in the radial direction of said shaft to an extent providing a small clearance space between the outer ends of said vanes and the inner surface of said drum, said vanes being provided at their outer ends with serrated means for breaking and loosening the shells of said crustaceans and being provided intermediate their ends with beating surfaces whereby said loosened shells are removed from said crustaceans, motor driving means, means connected with said motor means for driving said drum, and further means connected with said motor means for driving said shaft and beater vanes at a higher speed than that of said drum.

2. An apparatus for removing the shells from crustaceans such as crabs and shrimps, which comprises in combination: supporting means, a drum rotatably supported by said supporting means, said drum having a charging opening at one end thereof for charging crustaceans to be freed from their shells into said drum and also having a discharge opening at the other end of said drum for discharging the shelled meat of said crustaceans, the wall of said drum being provided with openings of a size permitting passage of smaller portions of said shells while retaining larger portions of said crustaceans, said wall exerting a gripping action upon said crustaceans, a shaft rotatably arranged within said drum, a plurality of substantially flat rigid beater vanes carried by said shaft for rotation therewith, each beater vane extending in the axial direction of said shaft for a length approximately equal to the length of said drum and extending in the radial direction of said shaft to an extent providing a small clearance space between the outer ends of said vanes and the inner surface of said drum, said vanes being provided at their outer ends with serrated means for breaking and loosening the shells of said crustaceans, and being provided intermediate their ends with beating surfaces whereby said loosened shells are further removed from said crustaceans, motor driving means, means connected with said motor means for driving said drum, and further means connected with said motor means for driving said shaft and beater vanes at a higher speed than that of said drum, and in a direction opposite to the direction of rotation of said drum.

3. An apparatus for removing the shells from crustaceans such as crabs and shrimps, which comprises in combination: supporting means, a drum rotatably supported by said supporting means, said drum having a charging opening at one end thereof for charging crustaceans to be freed from their shells into said drum and also having a discharge opening at the other end of said drum for discharging the shelled meat of said crustaceans, the wall of said drum being provided with openings of a size permitting passage of smaller portions of said shells while retaining larger portions of said crustaceans, said wall exerting a gripping action upon said crustaceans, a shaft rotatably arranged within said drum, a plurality of substantially flat rigid beater vanes carried by said shaft for rotation therewith, each beater vane extending in the axial direction of said shaft for a length approximately equal to the length of said drum and extending in the radial direction of said shaft to an extent providing a small clearance space between the outer ends of said vanes and the inner surface of said drum, said vanes being provided at their outer ends with ripping hooks for breaking and loosening the shells of said crustaceans, and being provided intermediate their ends with beating surfaces whereby said loosened shells are further removed from said crustaceans, motor driving means, means connected with said motor means for driving said drum, and further means connected with said motor means for driving said shaft and beater vanes at a higher speed than that of said drum.

4. An apparatus for removing the shells from crustaceans such as crabs and shrimps, which comprises in combination: supporting means, a drum rotatably supported by said supporting means, said drum having a charging opening at one end thereof for charging crustaceans to be freed from their shells into said drum and also having a discharge opening at the other end of said drum for discharging the shelled meat of said crustaceans, the wall of said drum being provided with openings of a size permitting passage of smaller portions of said shells while retaining larger portions of said crustaceans, said wall exerting a gripping action upon said crustaceans, a cylindrical brush having its bristles extending through the openings in the wall of said drum and being rotatable thereby, a shaft rotatably arranged within said drum, a plurality of substantially flat rigid beater vanes carried by said shaft for rotation therewith, each beater vane extending in the axial direction of said shaft for a length approximately equal to the length of said drum and extending in the radial direction of said shaft to an extent providing a small clearance space between the outer ends of said vanes and the inner surface of said drum, said vanes being provided at their outer ends with serrated means for breaking and loosening the shells of said crustaceans and being provided intermediate their ends with beating surfaces whereby said loosened shells are removed from said crustaceans, motor driving means, means connected with said motor means for driving said drum, and further means connected with said motor means for driving said shaft and beater vanes at a higher speed than that of said drum.

References Cited in the file of this patent

UNITED STATES PATENTS

| | | |
|---|---|---|
| 193,416 | McAuliffe | July 24, 1877 |
| 493,065 | Campbell | Mar. 7, 1893 |
| 1,080,982 | Knapp | Dec. 9, 1913 |
| 1,096,038 | Kramer | May 12, 1914 |
| 1,116,221 | Beyschlag | Nov. 3, 1914 |
| 2,236,113 | Quamma | Mar. 25, 1941 |
| 2,652,588 | Harris | Sept. 22, 1953 |
| 2,754,539 | Toti | July 17, 1956 |